United States Patent
Barthelemy et al.

(10) Patent No.: US 6,303,668 B1
(45) Date of Patent: Oct. 16, 2001

(54) AZEOTROPIC OR PSEUDO-AZEOTROPIC COMPOSITION AND USE OF THESE COMPOSITIONS

(75) Inventors: Pierre Barthelemy, Pietrebais; Olivier Buyle, Goutroux; Pierre Dournel, Bruselles, all of (BE)

(73) Assignee: Solvay (Societe Anonyme) (BE)

( * ) Notice: Subject to any disclaimer, the term of this patent is extended or adjusted under 35 U.S.C. 154(b) by 0 days.

(21) Appl. No.: 09/380,660

(22) PCT Filed: Feb. 21, 1998

(86) PCT No.: PCT/EP98/01124

§ 371 Date: Nov. 22, 1999

§ 102(e) Date: Nov. 22, 1999

(87) PCT Pub. No.: WO98/39378

PCT Pub. Date: Sep. 11, 1998

(30) Foreign Application Priority Data

Mar. 3, 1997 (BE) .................................................. 9700184
Dec. 3, 1997 (BE) .................................................. 9700984

(51) Int. Cl.[7] ................................................... C08J 9/14
(52) U.S. Cl. ...................... 521/131; 521/155; 521/170; 510/177; 510/273; 510/408; 510/412; 510/415
(58) Field of Search .................... 521/131, 155, 521/170; 510/177, 273, 408, 412, 415; 252/182.24

(56) References Cited

U.S. PATENT DOCUMENTS

| 5,458,798 | 10/1995 | Lunger et al. |
| 5,762,822 | * 6/1998 | Tucker .................................. 521/131 |
| 5,856,679 | * 6/1998 | Barthelemy et al. ................ 521/131 |

FOREIGN PATENT DOCUMENTS

| 171190 | 7/1990 | (JP) . |
| 05 168805 A | 7/1993 | (JP) . |
| 05 168811 | 7/1993 | (JP) . |
| 05 171190 A | 7/1993 | (JP) . |
| 168805 | 7/1993 | (JP) . |
| 05 239251 A | 9/1993 | (JP) . |
| 05 295154 A | 11/1993 | (JP) . |
| WO 96/30487 | 10/1996 | (WO) . |
| WO 97/31989 | 9/1997 | (WO) . |

OTHER PUBLICATIONS

Derwent No. 93–247656 "Compsns. For Removing Adhesion Water from IC, etc.—Composed of 1,1,1,2,2–penta:fluoro;butane, Solvent and Surfactant Comprising Salt of Organic Acid and Organic Base" (1993).

Murphy et al., The 1993 International CFC and Halon ALternatives Conference, Oct. 20–22, 1993.

XP002039032, "Aq. azeotropic and azeotrope–like blowing agents for poly–isocyanate foams—contg. fluorinated poly––isocyanate foams—contg. flurinated hydrocarbon cpds., iodo–substd. fluoro:hydrocarbon cpds. or fluoro:carbon cpds. opt. as substits. in cyclic ether, sulfide or amine cpds., etc." Database WPI, Section CH, Week 9648, Derwent Publications Ltd., London, GB; Class A25, AN 96–483946; Research Disclosure, vol. 390, No. 050, Oct. 10, 1996.

\* cited by examiner

*Primary Examiner*—John M. Cooney, Jr.
(74) *Attorney, Agent, or Firm*—Connolly Bove Lodge & Hutz LLP

(57) ABSTRACT

1,1,1,3,3-Pentafluorobutane forms azeotropic or pseudoazeotropic compositions with alkanes possessing 5 or 6 carbon atoms. These compositions can be used in particular as blowing agents in polymeric cellular foams.

16 Claims, No Drawings

AZEOTROPIC OR PSEUDO-AZEOTROPIC COMPOSITION AND USE OF THESE COMPOSITIONS

The invention relates to compositions comprising 1,1,1, 3,3-pentafluorobutane (also known as HFC-365mfc) and to the use of these compositions, in particular as blowing agents for polymeric cellular foams and more particularly for polyurethane foams.

It is well known that polyurethane foams can be prepared by reacting an isocyanate with an appropriate amount of a polyol or of a mixture of polyols in the presence of a blowing agent consisting of a volatile liquid, which is evaporated by the heat given off by the reaction between the isocyanate and the polyol. Trichlorofluoromethane (CFC-11), dichlorodifluoromethane (CFC-12) and, to a lesser extent, chlorodifluoromethane (HCFC-22), 1,1,2-trichlorotrifluoroethane (CFC-113) and 1,2-dichlorotetrafluoroethane (CFC-114) have been used for a long time as blowing agents. Because of its very low thermal conductivity, CFC-11 makes it possible to obtain particularly insulating rigid polyurethane foams, which are intensively used as thermal insulators, in particular in the fields of construction, refrigeration and transportation.

However, fully halogenated chlorofluorinated hydrocarbons (CFCs) are suspected of causing environmental problems, mainly in the context of the destruction of the stratospheric ozone layer. They are today banned in the majority of their conventional applications.

Chlorine-free hydrofluoroalkanes are completely inert with respect to the stratospheric ozone layer and these compounds are finding increasingly wide use in numerous applications, to the detriment of compounds carrying chlorine atoms. Thus, 1,1,1,3,3-pentafluorobutane (HFC-365mfc) has been proposed in various applications. Japanese Patent Applications JP 05/168805 and JP 05/171190 describe solvent compositions comprising 1,1,1,3,3-pentafluorobutane, a cosolvent soluble in 1,1,1,3,3-pentafluorobutane and optionally a surfactant. These compositions can be used in operations for cleaning objects or for the removal of residual water in the electronics industry. The only binary compositions described comprise 4% of n-pentane, 10% of cyclopentane or alternatively 5% of hexane.

Murphy and his coworkers (International CFC and Halon Alternatives Conference, Washington D.C., 1993, pp. 346–355) have described the use of cyclopentane/HFC-365mfc binary mixtures containing at least 54% by weight of cyclopentane as blowing agent for polyurethane foams. However, it has been noticed that there is a risk, in certain cases and under certain circumstances, of HFC-365mfc and the mixtures mentioned above condensing in the cells of the foam, resulting, if the case arises, in a deterioration in its thermal conductivity and optionally in its mechanical properties.

The need thus remains to find blowing agent compositions for polymeric cellular foams which are devoid of harmful effect on the environment, which have a boiling point close to the boiling point of CFC-11 or 1,1-dichloro-1-fluoroethane (HCFC-141b) and which possess the physical properties which make it possible to form polymeric cellular foams of low thermal conductivity in a wide range of temperatures, particularly foams with closed cells of homogeneous size.

One of the objects of the present invention is to provide compositions which perform particularly well when they are used as blowing agents, in particular for the manufacture of polyurethane foams. Another object of the invention is to provide such compositions which are devoid of destructive effect with respect to the ozone layer and which can consequently be used as replacement for compositions based on fully halogenated chlorofluoroalkanes, such as CFC-11, or on partially halogenated hydrocarbons containing chlorine atoms, such as HCFC-141b.

The present invention consequently relates to compositions composed essentially of 1,1,1,3,3-pentafluorobutane and of an alkane possessing 5 or 6 carbon atoms, which are characterized in that they are azeotropic or pseudoazeotropic.

The thermodynamic state of a fluid is fundamentally defined by four interdependent variables: the pressure (P), the temperature (T), the composition of the liquid phase (X) and the composition of the gas phase (Y). A true azeotrope is a specific system containing 2 or more components for which, at a given temperature and at a given pressure, the composition of the liquid phase X is exactly the same as the composition of the gas phase Y. A pseudoazeotrope is a system containing 2 or more components for which, at a given temperature and at a given pressure, X is substantially the same as Y. In practice, this means that the constituents of such azeotropic and pseudoazeotropic systems cannot be easily separated by distillation and, consequently, their composition remains constant in polymeric cellular foam blowing operations.

For the purposes of the present invention, pseudoazeotropic mixture is understood to mean a mixture of two constituents, the boiling of which (at a given pressure) differs from the boiling point of the true azeotrope by at most 0.5° C. Mixtures for which the boiling point differs from the boiling point of the true azeotrope by at most 0.2° C. are preferred. Mixtures for which the boiling point differs from the boiling point of the true azeotrope by at most 0.1° C. are particularly preferred.

The alkanes possessing 5 or 6 carbon atoms which can be used in the compositions according to the invention can be linear, branched or cyclic. Among all the possible isomers of the hydrocarbons possessing 5 or 6 carbon atoms, linear pentane (or n-pentane), isopentane (or 2-methylbutane), cyclopentane and linear hexane (or n-hexane) are preferred. The latter form, with 1,1,1,3,3-pentafluorobutane, azeotropic or pseudoazeotropic compositions with a minimum boiling point.

The azeotropic and pseudoazeotropic binary mixtures formed between 1,1,1,3,3-pentafluorobutane and cyclopentane are particularly preferred.

The relative contents of 1,1,1,3,3-pentafluorobutane and of alkane possessing 5 or 6 carbon atoms in the compositions according to the invention can vary within wide proportions, provided that the compositions thus formed are azeotropic or pseudoazeotropic with a minimum boiling point.

The compositions of the azeotropic mixtures according to the invention were estimated by calculation on the basis of the results of the experimental measurements presented in the examples below.

1,1,1,3,3-Pentafluorobutane and n-pentane form a binary azeotrope or pseudoazeotrope when their mixture contains approximately from 24 to 60% by weight of n-pentane. The binary compositions containing approximately from 30 to 53% by weight of n-pentane are preferred. The binary compositions containing approximately from 32 to 47% by weight are particularly preferred. Under a pressure of 103.5 kPa, the binary composition composed essentially of approximately 66% by weight of 1,1,1,3,3-pentafluorobutane and of approximately 34% by weight of n-pentane constitutes a true azeotrope, the boiling point of which is approximately 27.4° C. This composition is very particularly preferred. 1,1,1,3,3-Pentafluorobutane and cyclopentane form a binary azeotrope or pseudoazeotrope when their mixture contains approximately from 16 to 46% by weight of cyclopentane. The binary compositions containing approximately from 18.5 to 39% by weight of cyclopentane are preferred. The binary compositions containing approximately from 20 to 35% by weight of cyclopentane are particularly preferred.

Under a pressure of 101.4 kPa, the binary composition composed essentially of approximately 78.5% by weight of 1,1,1,3,3-pentafluorobutane and of approximately 21.5% by weight of cyclopentane constitutes a true azeotrope, the boiling point of which is approximately 32.2° C. This composition is very particularly preferred.

1,1,1,3,3-Pentafluorobutane and isopentane form a binary azeotrope or pseudoazeotrope when their mixture contains approximately from 31 to 75% by weight of isopentane. The binary compositions containing approximately from 39 to 70% by weight of isopentane are preferred. The binary compositions containing approximately from 45 to 60% by weight of isopentane are particularly preferred. Under a pressure of 101.2 kPa, the binary composition composed essentially of approximately 53% by weight of 1,1,1,3,3-pentafluorobutane and of approximately 47% by weight of isopentane constitutes a true azeotrope, the boiling point of which is approximately 22.5° C. This composition is very particularly preferred.

1,1,1,3,3-Pentafluorobutane and n-hexane form a binary azeotrope or pseudoazeotrope when their mixture contains approximately from 6 to 29% by weight of n-hexane. The binary compositions containing approximately from 9.5 to 24% by weight of n-hexane are preferred. Under a pressure of 102.1 kPa, the binary composition composed essentially of approximately 90% by weight of 1,1,1,3,3-pentafluorobutane and of approximately 10% by weight of n-hexane constitutes a true azeotrope, the boiling point of which is approximately 37.9° C. This composition is very particularly preferred.

The invention also relates to the use of the compositions according to the invention for the blowing of polymeric cellular foams.

The polymeric cellular foams can be obtained according to various processes. A commonly used process consists in injecting, under pressure, a blowing agent into a molten polymeric mixture to be expanded in an extruder. The decompression obtained at the outlet of the extruder results in the expansion of the polymeric mixture with formation of a foam composed of cells filled with the blowing agent. Polystyrene foams are generally obtained by this process. Another process, typically used to manufacture polyurethane or polyisocyanurate foams, consists in reacting an isocyanate with an appropriate amount of a polyol or of a mixture of polyols, in the presence of a blowing agent consisting of a volatile liquid, which is evaporated by the heat given off by the reaction between the isocyanate and the polyol. The compositions according to the invention are particularly recommended for the blowing of polyurethane or polyisocyanurate foams, very particularly for manufacturing rigid foams. In this case, use is generally made of 1 to 40, typically of 15 to 35, parts by weight of blowing agent per 100 parts by weight of polyol.

The invention also relates to blowing agents for polymeric cellular foams, which are characterized in that they contain an azeotropic or pseudoazeotropic composition according to the invention.

The blowing agents containing a composition according to the invention composed of 1,1,1,3,3-pentafluorobutane and of cyclopentane are particularly suited to the preparation of polyurethane or polyisocyanurate foams.

In an alternative form in accordance with the invention, the blowing agents also contain n-butane or isobutane, typically from 2 to 20% by weight, preferably from 5 to 15% by weight.

The blowing agents for polymeric cellular foams can also contain a stabilizer of the azeotropic or pseudoazeotropic composition according to the invention, such as nitromethane or a-methylstyrene.

The azeotropic or pseudoazeotropic compositions according to the invention can be used in premixes for polyurethane or polyisocyanurate foams. Such premixes contain at least one polyol, one azeotropic or pseudoazeotropic composition according to the invention and optionally various additives commonly used for preparing polyurethane or polyisocyanurate foams, such as, in particular, water, catalysts, surface-active agents, antioxidizing agents, flame-retardant agents and/or pigments. The premixes containing the azeotropic or pseudoazeotropic compositions according to the invention also form part of the present invention.

The invention also relates to the use of the azeotropic or pseudoazeotropic compositions described above as refrigerating fluids, as solvents, as desiccating agents or as degreasing agents for solid surfaces.

The non-limiting examples hereinbelow illustrate the invention in a more detailed way.

EXAMPLES 1–4

In order to demonstrate the existence of azeotropic or pseudoazeotropic compositions according to the invention between 1,1,1,3,3-pentafluorobutane and a hydrocarbon possessing 5 or 6 carbon atoms, a glass device composed of a 50 ml distillation flask surmounted by a reflux condenser was used. The temperature of the liquid was measured by means of a thermometer immersed in the flask.

An amount of pure 1,1,1,3,3-pentafluorobutane determined with accuracy was heated under a known pressure to boiling point and then small amounts of hydrocarbon, weighed with accuracy, were gradually introduced into the flask, by means of a syringe, via a side arm.

The pseudoazeotropic compositions were determined by plotting the change in the boiling temperature of the mixture as a function of its composition.

These measurements were made for mixtures containing 1,1,1,3,3-penta-fluorobutane and increasing amounts of n-pentane (Example 1), of cyclopentane (Example 2), of isopentane (Example 3) or of n-hexane (Example 4).

The pressure at which the measurements were taken is mentioned. The change in the boiling temperature of the various compositions as a function of their hydrocarbon content, expressed as weight %, is presented in Table I.

TABLE I

| Example 1 HFC-365 mfc/ n-pentane (Pressure: 103.5 kPa) | | Example 2 HFC-365 mfc/ cyclopentane (Pressure: 101.4 kPa) | | Example 3 HFC-365 mfc/ isopentane (Pressure: 101.2 kPa) | | Example 4 HFC-365 mfc/ n-hexane (Pressure: 102.1 kPa) | |
|---|---|---|---|---|---|---|---|
| Pentane (wt. %) | B.t. (° C.) | Cyclo-pentane (wt. %) | B.t. (° C.) | Isopent-ane (wt. %) | B.t. (° C.) | Hexane (wt. %) | B.t. (° C.) |
| 0 | 40.6 | 0 | 40.3 | 0 | 40.3 | 0 | 40.5 |
| 1.32 | 39.2 | 2.96 | 37.6 | 1.14 | 38.9 | 1.36 | 39.9 |
| 2.52 | 37.5 | 4.88 | 36.0 | 4.43 | 34.5 | 2.58 | 39.4 |
| 3.63 | 36.0 | 7.09 | 34.8 | 5.96 | 32.3 | 3.14 | 39.2 |
| 4.39 | 35.1 | 8.75 | 34.1 | 7.5 | 30.6 | 4.19 | 38.9 |
| 5.2 | 34.1 | 10.64 | 33.6 | 8.93 | 29.2 | 5.71 | 38.6 |
| 6.49 | 32.7 | 12.4 | 33.2 | 12.7 | 27.0 | 7.79 | 38.3 |
| 9.2 | 31.0 | 14.22 | 32.8 | 14.94 | 26.2 | 9.76 | 38.1 |
| 11.01 | 30.2 | 16.04 | 32.6 | 18.48 | 24.6 | 11.14 | 38.0 |
| 12.26 | 29.7 | 17.7 | 32.5 | 20.96 | 24.2 | 13.15 | 37.9 |
| 15.51 | 28.8 | 19.2 | 32.3 | 25.86 | 23.6 | 15 | 37.9 |
| 16.93 | 28.6 | 21.36 | 32.2 | 29.25 | 23.2 | 16.7 | 37.9 |
| 18.87 | 28.3 | 23.29 | 32.2 | 32.64 | 22.9 | 18.31 | 38.0 |
| 20.77 | 28.1 | 25.19 | 32.2 | 37.09 | 22.8 | 20.13 | 38.0 |
| 22.53 | 28.0 | 27.57 | 32.2 | 41.19 | 22.6 | 21.74 | 38.0 |
| 24.3 | 27.9 | 30.35 | 32.2 | 45.06 | 22.6 | 23.36 | 38.1 |
| 26.68 | 27.8 | 31.45 | 32.2 | 48.41 | 22.5 | 25.26 | 38.2 |
| 29.35 | 27.6 | 33.74 | 32.2 | 51.07 | 22.5 | 28.78 | 38.4 |
| 31.9 | 27.5 | 36.28 | 32.3 | 54.35 | 22.5 | 33.16 | 38.6 |
| 34.6 | 27.4 | 38.95 | 32.4 | 56.69 | 22.5 | 36.6 | 38.7 |
| 37.11 | 27.4 | 41.99 | 32.5 | 58.93 | 22.5 | 40.34 | 39.0 |
| 39.46 | 27.4 | 46.41 | 32.6 | 60.65 | 22.5 | 43.54 | 39.4 |
| 41.6 | 27.4 | 53.88 | 33.0 | 70.14 | 22.7 | 49.35 | 39.8 |
| 44.02 | 27.4 | 57.97 | 33.3 | 74.77 | 23.0 | 56.48 | 41.0 |
| 53 | 27.6 | 66.68 | 33.9 | 80.28 | 23.6 | 56.69 | 41.6 |
| 59.56 | 27.8 | 71.76 | 34.7 | 89.84 | 25.1 | 67.28 | 43.4 |
| 65.96 | 28.2 | 79.47 | 36.7 | 100 | 28.0 | 77.13 | 47.2 |
| 71.65 | 28.8 | 92.94 | 43.3 | | | 88.13 | 54.3 |
| 100 | 36.6 | 100 | 49.3 | | | 100 | 67.0 |

EXAMPLES 5–8

Polyurethane foams were prepared starting from the same formulation but using, as blowing agent, either HFC-365mfc (Example 5), cyclopentane (Example 6), an HFC-365mfc/ cyclopentane composition composed, by weight, of 72 parts of HFC-365mfc and of 28 parts of cyclopentane (Example 7) and an HFC-365mfc/n-pentane composition composed, by weight, of 58.4 parts of HFC-365mfc and of 41.6 parts of n-pentane (Example 8). The thermal conductivity (Lambda) of these foams was subsequently measured at different temperatures. The variations in thermal conductivity are presented in Table II. The thermal conductivity, measured at 24° C., of a foam obtained with HFC-365mfc was taken as reference. The variations are expressed as percents with respect to this reference. A positive variation corresponds to an increase in conductivity, that is to say to a decrease in the insulating power of the foam.

TABLE II

| Blowing agent | Example 5 HFC-365-mfc | Example 6 Cyclo-pentane | Example 7 HFC-365 mfc/ cyclopentane | Example 8 HFC-365 mfc/ n-pentane |
|---|---|---|---|---|
| Variation in conductivity (%) | | | | |
| at −7.5° C. | +6.4 | +2.4 | 0 | +2.8 |
| at 0° C. | +4.8 | +2 | −1.6 | +1.2 |
| at 10° C. | +1.2 | +1.2 | −6 | +1.2 |
| at 24° C. | 0 | +2.4 | 0 | +2.4 |

Whereas the thermal conductivity in the gas phase of cyclopentane is higher than that of HFC-365mfc (respectively 12 and 10.6 mW/m.K at 25° C.), a polyurethane foam blown with the 1,1,1,3,3-pentafluorobutane/ cyclopentane azeotropic mixture exhibits, at low temperature, a lower thermal conductivity than that of a comparable foam blown with HFC-365mfc, in the absence of cyclopentane.

Similar results are obtained with the HFC-365mfc/n-pentane azeotropic composition.

What is claimed is:

1. In a method for manufacturing a polymeric cellular foam, the improvement which consists in selecting a blowing agent comprising a composition forming a minimum boiling point binary azeotrope or pseudo-azeotrope at atmospheric pressure, said composition being selected from
    (a) a composition consisting of from approximately 47 wt % to 70 wt % of 1,1,1,3,3-pentafluorobutane and from approximately 30 wt % to 53 wt % of n-pentane;
    (b) a composition consisting of from approximately 61 wt % to 81.5 wt % of 1,1,1,3,3-pentafluorobutane and from 18.5 wt % to 39 wt % of cyclopentane;
    (c) a composition consisting of form approximately 30 wt % to 61 wt % of 1,1,1,3,3-pentafluorobutane and from approximately 39 wt % to 70 wt % of isopentane; and
    (d) a composition consisting of from approximately 76 wt % to 91.5 wt % of 1,1,1,3,3-pentafluorobutane and from approximately 9.5 wt % to 24 wt % of n-hexane.

2. A polymeric cellular foam which is obtained by the process as claimed in claim 1.

3. The polymeric cellular foam as claimed in claim 2, wherein the foam is polyurethane or polyisocyanurate.

4. The process as claimed in claim 1, wherein the blowing agent is present in 1 to 40 parts by weight per 100 parts by weight of said polyol.

5. The process as claimed in claim 4, wherein the blowing agent is in amount of 15 to 35 parts by weight per 100 parts by weight of said polyol.

6. The process as claimed in claim 5, wherein the foam is a polyurethane foam.

7. The process as claimed in claim 1, wherein the composition contains approximately 66% by weight of 1,1,1,3,3-pentafluorobutane and approximately 34% by weight of n-pentane, and the composition has a boiling point of approximately 27.4° C. under a pressure of 103.5 kPa.

8. The process according to claim 1, wherein the composition contains a approximately 78.5% by weight of 1,1,1,3,3-pentafluorobutane and approximately 21.5% by weight of cyclopentane and the composition has a boiling point of approximately 32.2° C. under a pressure of 101.4 kPa.

9. The process according to claim 1, wherein the composition contains approximately 53% by weight of 1,1,1,3,3-pentafluorobutane and approximately 47% by weight of isopentane and the composition has a boiling point of approximately 22.5° C. under a pressure of 101.2 kPa.

10. The process according to claim 1, wherein the composition contains approximately 90% by weight of 1,1,1,3, 3-pentafluorobutane and approximately 10% by weight of n-hexane and the composition has a boiling point of approximately 37.9° C. under a pressure of 102.1 kPa.

11. A method for manufacturing a polymeric cellular foam, which comprises reacting an isocyanurate with a polyol or mixture of polyols in the presence of a blowing agent and said blowing agent comprises a composition forming a minimum boiling point binary azeotrope or pseudo-azeotrope at atmospheric pressure, said composition being selected from (a) a composition consisting of from approximately 47 wt % to 70 wt % of 1,1,1,3,3-pentafluorobutane and from approximately 30 wt % to 53 wt % of n-pentane;

(b) a composition consisting of from approximately 61 wt % to 81.5 wt % of 1,1,1,3,3-pentafluorobutane and from 18.5 wt % to 39 wt % of cyclopentane;

(c) a composition consisting of form approximately 30 wt % to 61 wt % of 1,1,1,3,3-pentafluorobutane and from approximately 39 wt % to 70 wt % of isopentane; and (d) a composition consisting of from approximately 76 wt % to 91.5 wt % of 1,1,1,3,3-pentafluorobutane and from approximately 9.5 wt % to 24 wt % of n-hexane.

12. An azeotrope composition consisting essentially of (a) a composition consisting of from approximately 47 wt % to 70 wt % of 1,1,1,3,3-pentafluorobutane and from approximately 30 wt % to 53 wt % of n-pentane;

(b) a composition consisting of from approximately 61 wt % to 81.5 wt % of 1,1,1,3,3-pentafluorobutane and from 18.5 wt % to 39 wt % of cyclopentane;

(c) a composition consisting of form approximately 30 wt % to 61 wt % of 1,1,1,3,3-pentafluorobutane and from approximately 39 wt % to 70 wt % of isopentane; or (d) a composition consisting of from approximately 76 wt % to 91.5 wt % of 1,1,1,3,3-pentafluorobutane and from approximately 9.5 wt % to 24 wt % of n-hexane.

13. An azeotrope composition according to claim 12, wherein the composition contains approximately 66% by weight of 1,1,1,3,3-pentafluorobutane and approximately 34% by weight of n-pentane, and the composition has a boiling point of approximately 27.4° C. under a pressure of 103.5 kPa.

14. The azeotrope composition according to claim 12, wherein the composition contains a approximately 78.5% by weight of 1,1,1,3,3-pentafluorobutane and approximately 21.5% by weight of cyclopentane and the composition has a boiling point of approximately 32.2° C. under a pressure of 101.4 kPa.

15. The azeotrope composition according to claim 12, wherein the composition contains approximately 53% by weight of 1,1,1,3,3-pentafluorobutane and approximately 47% by weight of isopentane and the composition has a boiling point of approximately 22.5° C. under a pressure of 101.2 kPa.

16. The azeotrope composition according to claim 12, wherein the composition contains approximately 90% by weight of 1,1,1,3,3-pentafluorobutane and approximately 10% by weight of n-hexane and the composition has a boiling point of approximately 37.9° C. under a pressure of 102.1 kPa.

* * * * *